United States Patent
Chambers et al.

(10) Patent No.: US 10,531,127 B2
(45) Date of Patent: Jan. 7, 2020

(54) PROCESSES SYSTEMS AND METHODS FOR IMPROVING VIRTUAL AND AUGMENTED REALITY APPLICATIONS

(71) Applicant: SERIOUS SIMULATIONS, LLC, Orlando, FL (US)

(72) Inventors: Christopher M. Chambers, Oviedo, FL (US); Damon Curry, Orlando, FL (US); Larry Alan McGinn, Orlando, FL (US); Dan Merillat, Kissimmee, FL (US)

(73) Assignee: Serious Simulations, LLC, Orlando, FL (US)

( * ) Notice: Subject to any disclaimer, the term of this patent is extended or adjusted under 35 U.S.C. 154(b) by 0 days.

(21) Appl. No.: 15/738,065

(22) PCT Filed: Jun. 20, 2016

(86) PCT No.: PCT/US2016/038374
§ 371 (c)(1),
(2) Date: Dec. 19, 2017

(87) PCT Pub. No.: WO2016/205800
PCT Pub. Date: Dec. 22, 2016

(65) Prior Publication Data
US 2018/0192075 A1    Jul. 5, 2018

Related U.S. Application Data

(60) Provisional application No. 62/182,197, filed on Jun. 19, 2015.

(51) Int. Cl.
*H04N 19/88*      (2014.01)
*H04N 19/59*      (2014.01)
(Continued)

(52) U.S. Cl.
CPC ............. *H04N 19/88* (2014.11); *G06F 17/16* (2013.01); *G06T 3/60* (2013.01); *G06T 19/006* (2013.01); *H04N 7/04* (2013.01); *H04N 19/59* (2014.11)

(58) Field of Classification Search
CPC ........... H04N 19/88; G06F 17/16; G06T 3/60
See application file for complete search history.

(56) References Cited

U.S. PATENT DOCUMENTS

2010/0046615 A1\*    2/2010    Chen .................... H04N 19/597
                                                                                             375/240.03

\* cited by examiner

*Primary Examiner* — Ryan R Yang
(74) *Attorney, Agent, or Firm* — Maxwell L. Minch; GrayRobinson, P.A.

(57) ABSTRACT

The present invention provides for systems and methods of transmitting and converting a landscape image to a portrait image for use in a virtual reality (VR) and augmented reality (AR) environment at a very high speed with negligible latency thus providing a seamless video feed to enhance the VR or AR environment to meet the demands of VR and AR head mounted displays. The present invention further provides for systems and methods for compositing and communicating video, audio, user data, and commands for VR and AR applications with stationary and moving participants. The present invention overcomes the unmet needs of the art by providing a wireless video processing which includes equipment that has a low power consumption, while providing a reliable and seamless virtual or simulated environment. The present invention further overcomes the unmet need by providing systems and methods to reduce the latency caused by image rotation.

8 Claims, 9 Drawing Sheets

(51) Int. Cl.
*G06F 17/16* (2006.01)
*G06T 3/60* (2006.01)
*G06T 19/00* (2011.01)
*H04N 7/04* (2006.01)

PROCESSES SYSTEMS AND METHODS FOR IMPROVING VIRTUAL AND AUGMENTED REALITY APPLICATIONS

CROSS-REFERENCE TO RELATED APPLICATIONS

The present application claims priority of U.S. Provisional patent application No. 62/182,197 filed on Jun. 19, 2015, U.S. Provisional patent application No. 62/291,267 filed on Feb. 26, 2016, and U.S. Provisional patent application No. 62/302,015 filed on Mar. 11, 2016 the contents of which is herein incorporated by reference.

FIELD OF THE INVENTION

The present invention relates in general to virtual and augmented reality systems. The present invention further relates to transmission and receiving of images and video, and in particular, to wireless transmission and reception of video, audio, and data to meet the demands of head mounted displays for virtual reality and augmented reality use. Finally, the present invention further relates particularly to image processing, the transmission and receiving thereof, and in particular to conversion of video image orientation from landscape to portrait.

BACKGROUND OF THE INVENTION

Simulation, virtual reality and augmented reality is a growing industry and stands to supplement, and in some cases, replace conventional training atmospheres. Using unique VR and AR technologies, real-time interaction is imperative in order for a user to become mentally and emotionally immersed in the computer-generated virtual environment. Thus the primary goal when creating any simulation, virtual reality or augmented reality environment is to ensure a seamless simulated environment without creating distractions that would deviate the attention of the user away from the environment. Two common problems include lag time and wire tethering of users.

One of the main goals in virtual reality is to create a completely wireless system such that the user may become immersed in the virtual or augmented reality. Realistic virtual reality systems for training or entertainment require the system to be customized for safe use by a human being in motion As a result, have a user being tethered with electrical power or data carrying wires to any sort of system is undesirable. In addition, the slightest lag time or buffering of information into such environments can ruin or interrupt the environment, thus making such training ineffective. In addition, power and signal wires connected to head mounted displays (HMDs) interfere with the VR and AR immersive experience. However to date present attempts at a wireless VR and AR immersive experience solution increase lag time significantly making an unusable virtual or augmented reality.

Use of wireless HMDs is technically challenging due to issues of weight, battery power, display quality, and image latency. Video displays like those used in cell phones are lightweight, have excellent display quality, and require low power consistent with battery-powered use. However, a critical additional requirement for acceptable use by humans is to minimize the lag between the motion of the user's head and the corresponding updating of the visual displays. This lag time is very distracting and can induce nausea, preventing a user from using the device to become immersed in a virtual or augmented simulation.

Video display equipment, including computer graphics cards and video display screens, must conform to video standards set by electronics industry organizations such as the Institute of Electrical and Electronic Engineers (IEEE). In addition, the Federal Communications Commission defines radio frequencies and other details related to radio transmissions including transmission of wireless video signals. The WirelessHD Consortium is a group of independent companies that work together to promote technological advancement and adoption of wireless video equipment in compliance with established video standards and FCC regulations. At this time, the member of the WirelessHD Consortium that designs and manufactures WirelessHD-related integrated circuits is the company Silicon Images (a subsidiary of Lattice Semiconductor). Existing attempts to create a wireless virtual technology used wireless video standards evolved from market demand to connect statically placed home/office television equipment, such as connecting a DVD player or set-top box to a wall-mounted television. As a result, commercial off-the-shelf wireless video equipment conforms to legal (such as the FCC) and operational standards that were developed with home/office televisions and monitors in mind, without thought to application to virtual reality. Notwithstanding, existing virtual reality components make use of many of this type of equipment, thus there remains an unmet need for virtual reality grade wireless video equipment, or a system or method for augmenting video signals from existing wireless video equipment to make the video signals better adaptable to virtual reality use. In addition, wireless (untethered) virtual reality and augmented reality imposes additional demands on video, audio, and data. VR/AR applications use head or helmet mounted displays (HMDs), which despite their name including "display" also include headphones and microphones for audio and controls that need to be remotely controlled. These off-the shelf systems are poor for VR systems in several ways because a) they have a limited visual resolution not exceeding 1920×1080, b) have a limited refresh-rate set at 60 Hz where 90 Hz is preferred for VR, c) limits transmissions to a single user; d) only single video streams can be processed at one by a transmitter/receiver pair; e) transmission beam only dynamically altered to provide a low-strength reflected signal (see FIG. 1A) relative to a receivers position; f) the WirelessHD (WiHD) Receiver is actually a Receiver/Transmitter combination, thus the "Receiver" radiates millimeter-wave energy that's harmful to humans above certain limits, and FCC certification requires placement of the Receiver at least 20 cm (~8 inches) away from the user; g) audio is transmitted without audio-related control ability; h) there is no capability to remotely control or pass instructions to the HMD; and i) there is no capability to pass other (non-command) data to the HMD. Thus there remains an unmet need for a virtual reality video, audio and data communications equipment that overcomes these shortcomings, which allows for the placement of receivers directly on a user, which provides a line of sight transmission to a moving receiver worn by a virtual reality user, and which provides a way to pass commands and data to the equipment worn by the user.

In addition to the above shortcomings, conventional over the air video transmitters and receivers have a high power consumption, and thus are not very good candidates to be battery powered. As a result in order to use them either a large amount of weight in the form of batteries needs to be carried by the user, the simulated environment is limited to short periods of time reflecting the particular battery life, or requires that a user be tethered to a power source. A key point, critical to the subject of this patent application, is that cell phone displays are natively Portrait mode devices but WirelessHD transmitters, for example those currently produced by Silicon Images, can only transmit a 1080p high resolution image in Landscape mode. To use a Portrait display device, such as a cell phone display screen, with a WirelessHD receiver that must operate in Landscape mode, the received image must be rotated ninety degrees. This required image rotation can be done by buffering an entire frame of the image, then rotating the entire image, but that approach induces one full frame of latency. At 60 frames per second, each frame is delayed by 16.7 milliseconds. Such a long lag time is widely considered unacceptable for real time immersive virtual reality and augmented reality systems because that long lag is perceptible, distracting, and sometimes sickening to humans in immersive environments.

Thus each shortcoming described above provides major disruptions to a simulated, virtual or augmented reality, and thus there remains an unmet need for wireless video processing equipment that has a low power consumption while providing a reliable and seamless virtual or simulated environment. In addition, there further remains an unmet need to reduce the latency caused by image rotation in such video systems.

SUMMARY OF INVENTION

The present invention overcomes the unmet needs provided above by providing a wireless video processing method and systems which includes equipment that has a low power consumption while providing a reliable and seamless virtual or simulated environment. The present invention further overcomes the unmet need by providing systems and methods to reduce the latency caused by image rotation in such video systems The present invention provides for processes of transmitting and converting a landscape image to a portrait image for use in a virtual or augmented reality environment at a very high speed with negligible latency thus providing a seamless video feed to enhance the virtual or augmented environment. The method includes processing a video image that has landscape image orientation, relocating pixels of the image creating a scrambled/encoded image while maintaining landscape image orientation, transmitting the scrambled/encoded image as relocated image data, and receiving the scrambled/encoded image data and creating an unscrambled/decoded image upon receipt that is in portrait image orientation. In some embodiments the method further includes processing pixel data of the video image, and moving the pixel data from a pixel location in the video image to a different pixel location in a relocated image, such that the image data within the relocated image is transposed while remaining in a landscape image orientation.

The present invention further includes systems for transposing an image from landscape to portrait, which includes a video source containing at least one video image, a pixel shader for receiving the at least one video image and relocating the pixels of the video image while maintaining the picture orientation to create a relocated image, a high definition (HD) video transmitter for transmitting said relocated image, a HD video receiver for receiving said relocated image, a converter for transposing the received relocated image to a portrait image orientation; and a display for receiving the transposed image in portrait image orientation.

The present invention further provides for systems and methods for compositing and communicating video, audio, and commands/user defined data for virtual reality (VR) and augmented reality (AR) applications with stationary and moving participants. The method includes calculating position information for a receiver located on a VR User, communicating the position information to a transmitter having a steerable antennae, steerable signal, or other acceptable method to target the intended VR/AR receiver having the ability to redirect a transmitted signal, and targeting said transmitter redirecting the transmitted signal based on the position information to maintain a line of sight signal to a receiver. Some embodiments include converting the video signal between standard HDMI, at various resolutions and frame rates, and the type of signal used prior to transmitting said signal. Some embodiments include utilizing the transmission signal to send video and audio, and added capacity for command and user-defined data, where utilization of the video transmission is used to embed command or user defined data elements at the end of each row (or line) of video whether transmitted in landscape (or portrait) modes or where utilization of the video transmission is used to embed command or user defined data in the first pixel of each frame of video.

For present invention further includes systems for seamlessly transmitting a virtual reality signal which includes a receiver for receiving a signal, a computing device, a two-dimensional or three-dimensional position tracker, and a transmitter having a targeting capability to a specific receiver, where the position tracker and said receiver are located proximal to each other on a VR/AR user or on a VR/AR user's gear, the computing device receives position data from the position tracker, and provides a signal to the transmitter or the antennae of the transmitter, and the antennae redirects the signal from the transmitter upon receiving the position data from the computing device.

BRIEF DESCRIPTION OF THE DRAWINGS

The present invention is further detailed with reference to the following figures. These figures are not intended to be a limitation on the scope of the invention, but rather to illustrate specific aspects of the invention.

FIG. 5A provides an original image in landscape image orientation providing a large scale representation of how each pixel is originally arranged in the original video image. FIG. 5B provides a visual representation of how the image data is relocated within the original landscape image to create a relocated image which remains in landscape image orientation. FIG. 5C provides a visual representation of the image after it is received and transposed to a portrait image.

DETAILED DESCRIPTION OF THE INVENTION

Figure 1A:
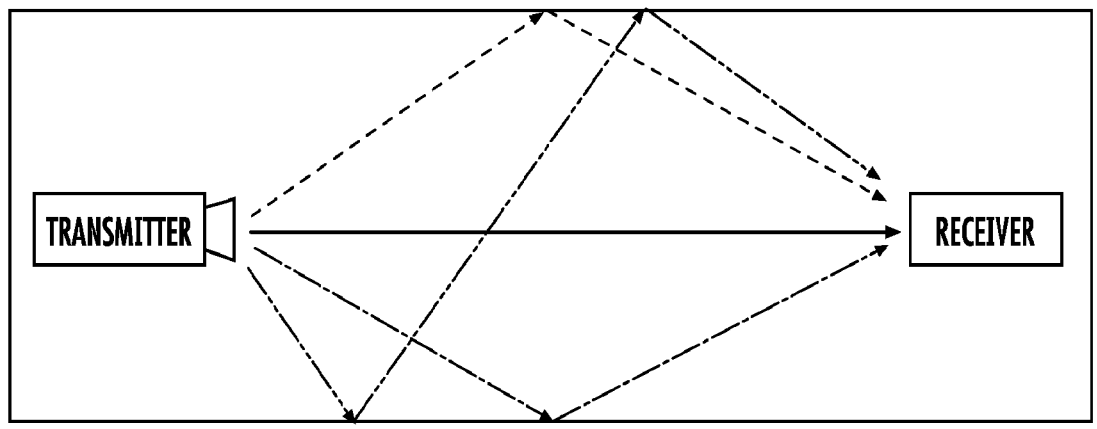
FIG. 1A provides an illustration of the prior art video transmitting methodology which does not rely on line of sight or a receiver in motion.
Figure 1B:
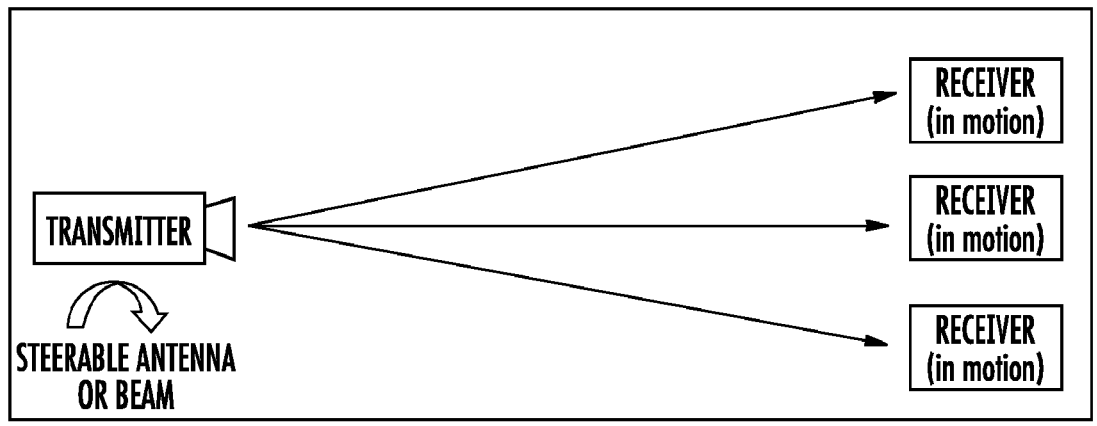
FIG. 1B provides an illustration of the transmitting methodology used in the present invention by moving a transmitter to provide a line of sight video signal to a receiver in motion based on position data related to the receiver.

The present invention provides for systems and methods for compositing and communicating video, audio, and commands/user defined data for virtual reality (VR) and augmented reality (AR) applications with stationary and moving participants. The present invention has utility at accomplishing specially composited virtual reality video/audio/data transmission and providing transmission of specially composited virtual reality video/audio/data transmission to a moveable receiver in a simulated, virtual or augmented reality scenario. The present invention achieves superior performance through a combination of a two or three dimensional position tracker being part of, attached to, or within the vicinity of one or more receivers on a virtual reality user. It is appreciated that the position information is used to augment or change the transmission direction of a transmission antennae in order to provide a real-time line of sight transmission to a moving receiver. FIG. 1B provides an illustration of the transmitting methodology used in the present invention by moving a transmitter to provide a line of sight video signal to a receiver in motion based on position data related to the receiver.

The present invention further provides for processes of transmitting and converting and a landscape image to a portrait image for use in a virtual or augmented reality environment at a very high speed with negligible latency thus providing a seamless video feed to enhance the virtual or augmented environment. The present invention has utility at converting a landscape image to a portrait image for use in a virtual or augmented reality environment at a very high speed with negligible latency thus providing a seamless video feed to enhance the virtual or augmented environment. The present invention achieves superior performance through a combination of a pixel shader (software running on a computer video card) and custom hardware in the wireless HDMI video signal receiver path. It is appreciated that the pixel shader operates on an image, specifically one video frame, while the image is still held in the graphics card's memory, before the graphics card outputs that frame of video (via HDMI, for example). Thus a video image is communicated or received by a graphics card or video card and processed by the pixel shader prior to being communicated as an output image from the video card. By relocating pixels in the video card's output image prior to video signal transmission, then transmitting the altered image (still technically correct as a Landscape format image), the receiver and subsequent image processing conversion hardware can transpose the image in real-time into a Portrait image. Processing time "per row" can vary depending on the electronic circuit implemented, but each row passes by in about 16 microseconds in a 1080p 60 Hz system. Without being bound to any particular theory, this technique, image rotation is accomplished on a "per row" basis, resulting in a processing delay of less than 17 microseconds, roughly 1,000 times faster than image rotation on a "per frame" basis. It is appreciated that this process may be used to process or buffer individual or multiple rows at time and that lag time may be adjusted using the same process to include longer delays, if such a latency is desired, or is negligible in the virtual or augmented environment.

The following detailed description is merely exemplary in nature and is in no way intended to limit the scope of the invention, its application, or uses, which may vary. The invention is described with relation to the non-limiting definitions and terminology included herein. These definitions and terminology are not designed to function as a limitation on the scope or practice of the invention, but are presented for illustrative and descriptive purposes only.

As used herein "image transposition" shall mean for the matrix $A_{m,n}$ that the matrix is converted into the matrix $A^T_{n,m}$.

As used herein "intermediate matrix" or "relocated image" is the matrix of $A'_{m,n}$ which contains the same number of rows and columns of the original image matrix of $A_{m,n}$ with the pixel information relocated prior to transmission such that the received information may be processed or converted into a portrait image orientation while the relocated image is being received.

As used herein "per row" basis shall mean for an oriented image, the horizontal data for a given line.

As used herein "signal" shall mean a digital signal comprised of video, audio and data elements. Furthermore, the data element is subdivided into Command and Supporting Data sub-elements. As a result, the signal carries video and audio to the virtual reality or augmented reality user and carries commands (instructions) with supporting data to the user's display device, typically a head mounted display device.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

System

Figure 2:
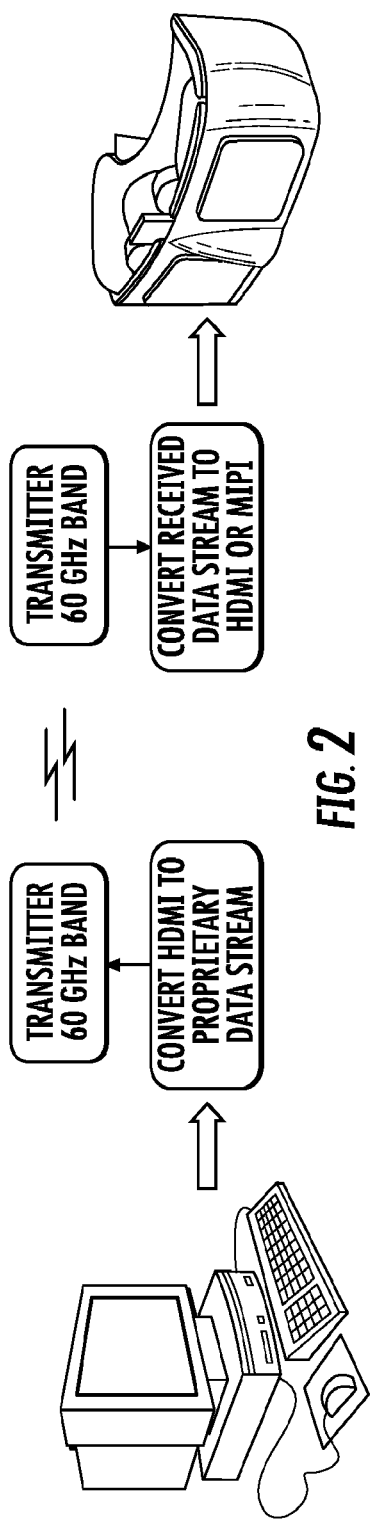
FIG. 2 provides an illustration of processed data being communicated to a transmitter which is to be received by a receiver and communicated to a headset.

A system for seamlessly transmitting a specially composited virtual reality video/audio/data transmission signal to a virtual reality receiver is provided. The system includes at least one receiver for receiving signal, comprised of video, audio and data components, which is in proximity to a three dimensional position tracker. Having the separate three dimensional position tracker and receiver allows for a user to wear the receiver in a headset while providing position information to the transmitter for dynamic or actual signal direction adjustment. FIG. 2 provides an illustration of processed data being communicated to a transmitter which is received by a receiver and communicated to a headset in at least one embodiment of the invention. The receiver serves the function of receiving the transmitted signal and communicating that signal to a virtual reality headset. In some embodiments, the receiver further decodes or transcodes all or a portion of the received signal that is received from a transmitter or transmitting device. The at least one three dimensional position tracker within proximity of the receiver allows for accurate real-time position data of the receiver, without using millimeter-wave energy that's harmful to humans allowing the receiver to be worn on the head of the user. In some embodiments, the receiver is incorporated in a head mounted display device.

Figure 3:
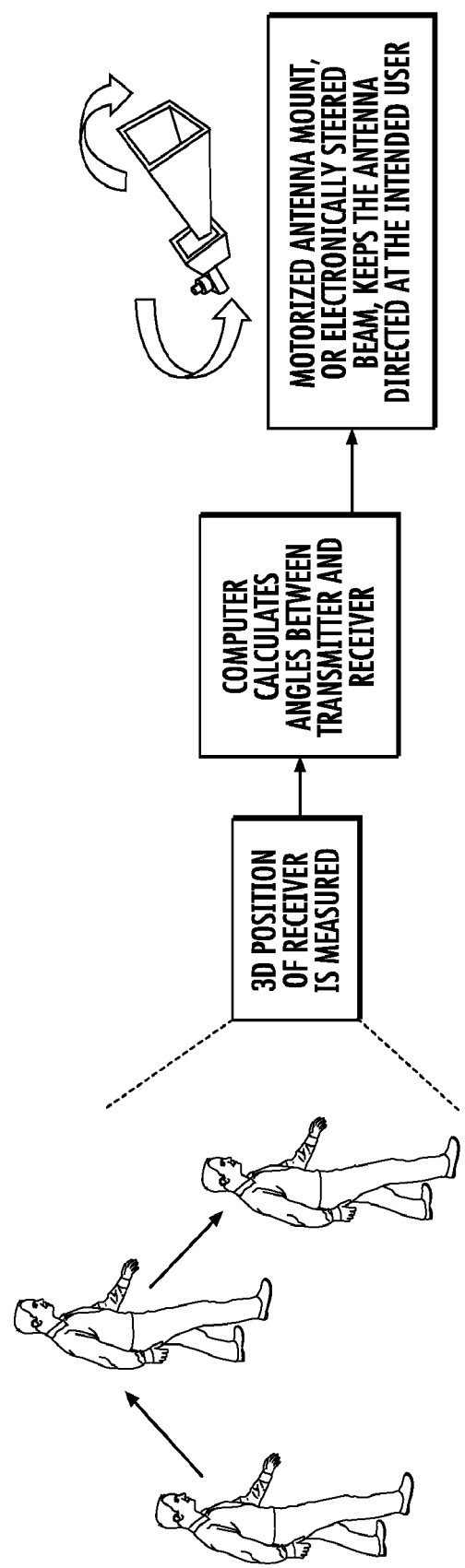
FIG. 3 provides an illustration for receiving three dimensional position information related to a user or the receiver being worn by a user which is computed and used to alter the position of a transmitting antennae to provide a real-time line of sight transmission to one or more receivers being worn by a user.

The inventive system optionally includes at least one computing device for receiving information from one or more three dimensional position trackers in order to rapidly calculate position data and use that position data to realign a transmitter such that a transmitter is positioned to provide a line of sight transmission to the receiver. FIG. 3 provides an illustration for receiving three dimensional position information related to a user or the receiver being worn by a user which is computed and used to alter the position of a transmitting antennae to provide a real-time line of sight transmission to one or more receivers being worn by a user. It is appreciated that a computing device may be a stand-alone computing unit or included as part of the transmitter, the receiver, or the position tracker. It is further appreciated that the transmitted signal may be redirected either by dynamically altering the signal direction electronically, or by a physical repositioning of the transmitting antennae.

The transmitter antennae may be realigned utilizing any means known in the art. It is appreciated that motors, servos, or other mechanisms allow for the automated movement of an object in relation to position data. In at least one embodiment, the system includes a transmitter having a motorized antenna. The motorized antenna receives the position information and adjusts its location, angle, or vector in relation to the received position data.

Methods

A method for seamlessly transmitting a specially composited virtual reality video/audio/data signal is also provided. The inventive method relies on the systems herein described. The method includes the use of at least one transmitter for transmitting at least one virtual reality video/audio/data signal to at least one receiver. In order to provide an optimum wireless signal, it is appreciated that providing a line of sight signal from the transmitter to the receiver is best. In at least one embodiment the position of a receiver is calculated based on data from a position tracker located on or near a receiver being worn by a virtual reality user. The position information related to the receiver location may be updated at several intervals, however it is appreciated for a high frequency of position termination to allow for the seamless movement of a transmitter in relation to the movement of a receiver. In at least one embodiment, one or more signals from one or more transmitters' antennae is used to provide a line of sight signal transmission to at least one receiver based on the position information provided by the position trackers.

The method further includes several additional techniques which provide for a more reliable signal and faster signal processing to allow for the seamless display of virtual or augmented reality video in order to provide an effective training environment. In at least one embodiment the video signal from a standard HDMI source, such as a computer's graphics card, is manipulated digitally to embed the information contained in the source video in the composite digital data stream that's sent wirelessly to the virtual reality/augmented reality user. In at least one embodiment, the video image may be rotated to suit the input video requirements of the user's display device.

One example of utilization of the video transmission to embed command or user defined data elements at the end of each row (or line) of video whether transmitted in landscape (or portrait) modes. This method permits thousands of commands to be embedded in every frame of video. Another example is the embedding of command or user defined data in the first pixel of each frame of video, which limits the amount of data to be transmitted per frame, but eliminates the hardware requirement for specially compositing the video, audio and command data and replaces this requirement with software code at the Graphics Processing Unit. (i.e. eliminate the need for "Conversion to a Proprietary Data Stream" out of FIG. 2, and simply utilize the conventional data stream with one pixel having been replaced with command data.)

In other embodiments, the video is processed to target specific users in a virtual or augmented environment prior to transmitting the video signal. The transmitted signal includes information that uniquely identifies the intended recipient. The receiving equipment can then use that identification information so that it processes only signals intended for itself. In this way, multiple users of the system can operate with video/audio/data signal integrity and security in the same physical environment.

In at least one embodiment, the video signal is transmitted in the 60 GHz unrestricted band, a region of the radio frequency spectrum that's been set aside for this and other applications by the US Federal Communications Commission (FCC) and similar regulatory authorities in other nations. The 60 GHz band permits low power, unlicensed operation of radio systems requiring very high bandwidth, such as transmission of high frame rate, high resolution video.

Conversion Method

A method for rotating a transmitted video image from portrait to landscape is provided. The method includes processing a video image that has landscape image orientation, relocating pixels of the video image creating a scrambled/encoded image in landscape image orientation, transmitting the scrambled/encoded image to a receiver that unscrambles/decodes the image into portrait image orientation. It should be appreciated that converting a 1920×1080 landscape oriented image to a 1080×1920 portrait oriented image using the method described herein can be accomplished at very high speed, with negligible latency because image rotation can be accomplished on a "per row" basis. As a result, processing delay can be less than 17 microseconds, which is approximately 1,000 times faster than conventional image rotation on a "per frame" basis.

In at least one embodiment, relocating pixels includes performing matrix operation on original pixel data, without altering the pixel data, to rearrange the pixel data within the original matrix, preserving the rows and columns of the matrix (the landscape image orientation), while the pixel data is relocated to optimize conversion from a landscape image orientation to a portrait image orientation. It is possible for today's WirelessHD transmitters to broadcast in Portrait mode, but it is appreciated that such transmission occurs in a significant decrease in the resolution of 1080p at 60 Hz which becomes problematic when attempting to simulate a realistic virtual or augmented reality environment. Because today's WirelessHD transmitters are limited to broadcasting higher quality 1080p 60 Hz images in landscape image orientation, preprocessing the original images to create the scrambled/encoded image must be accomplished while retaining the Landscape format. It is appreciated that without the scrambling/encoding preprocessing step that an image must be fully transmitted and fully received before it could be converted from landscape image orientation to portrait image orientation. It is appreciated that the scrambled/encoded Landscape format image is a quasi-transposition of the image data such that pixels can be rearranged after wireless receipt thus restoring the original image for presentation on a native Portrait mode display device. In at least one embodiment, restoring the image and converting it to Portrait orientation is done while continuously receiving image data. In some embodiments, a partial row of pixels or one or more rows of the scrambled/encoded image is buffered prior to the data being converted to portrait orientation, thus restoration and conversion of the image is done without waiting for receipt of a full frame of video. In other embodiments, a plurality of rows is buffered prior to the data being converted to portrait orientation.

Figure 5A:
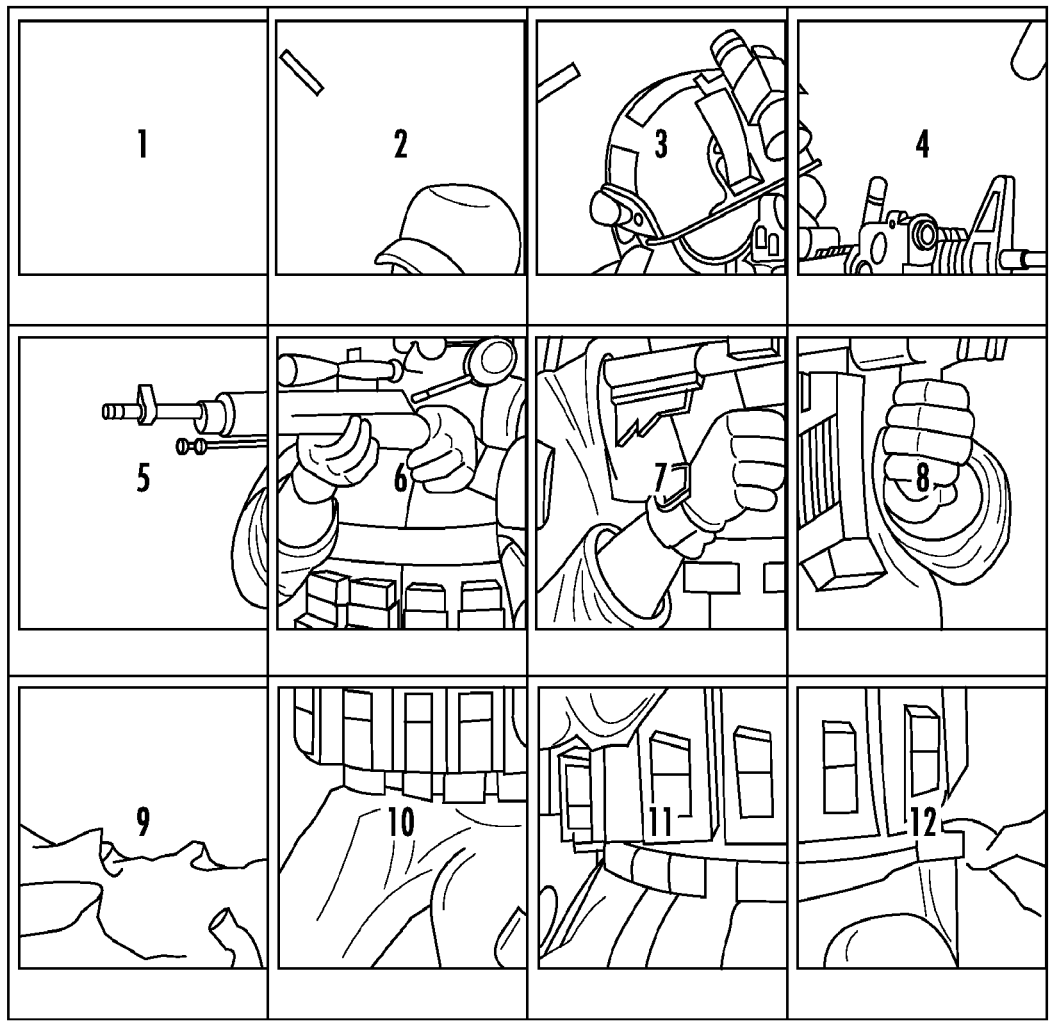
FIGS. 5A to 5C illustrate the varying stages of the image transposition from landscape to portrait.
Figure 5B:
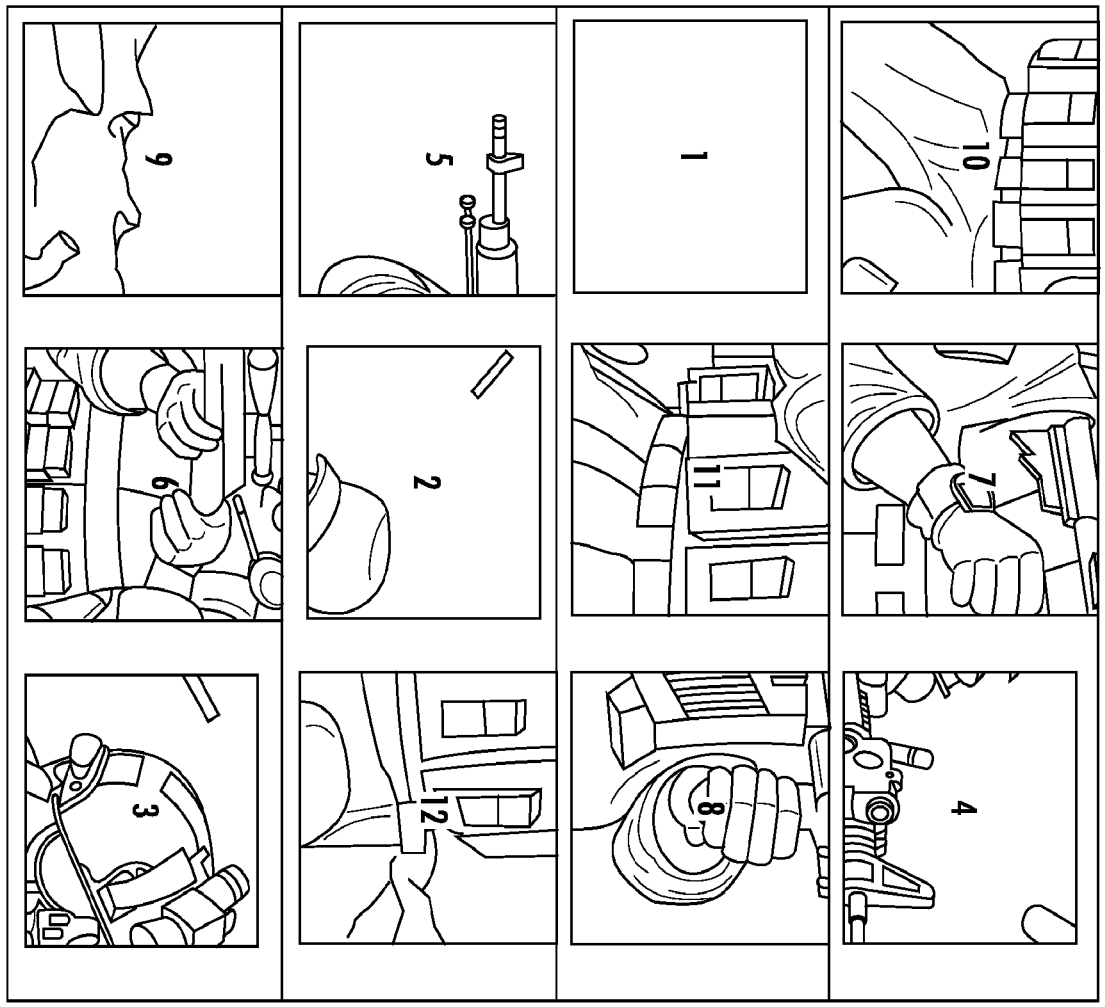
Figure 5C:
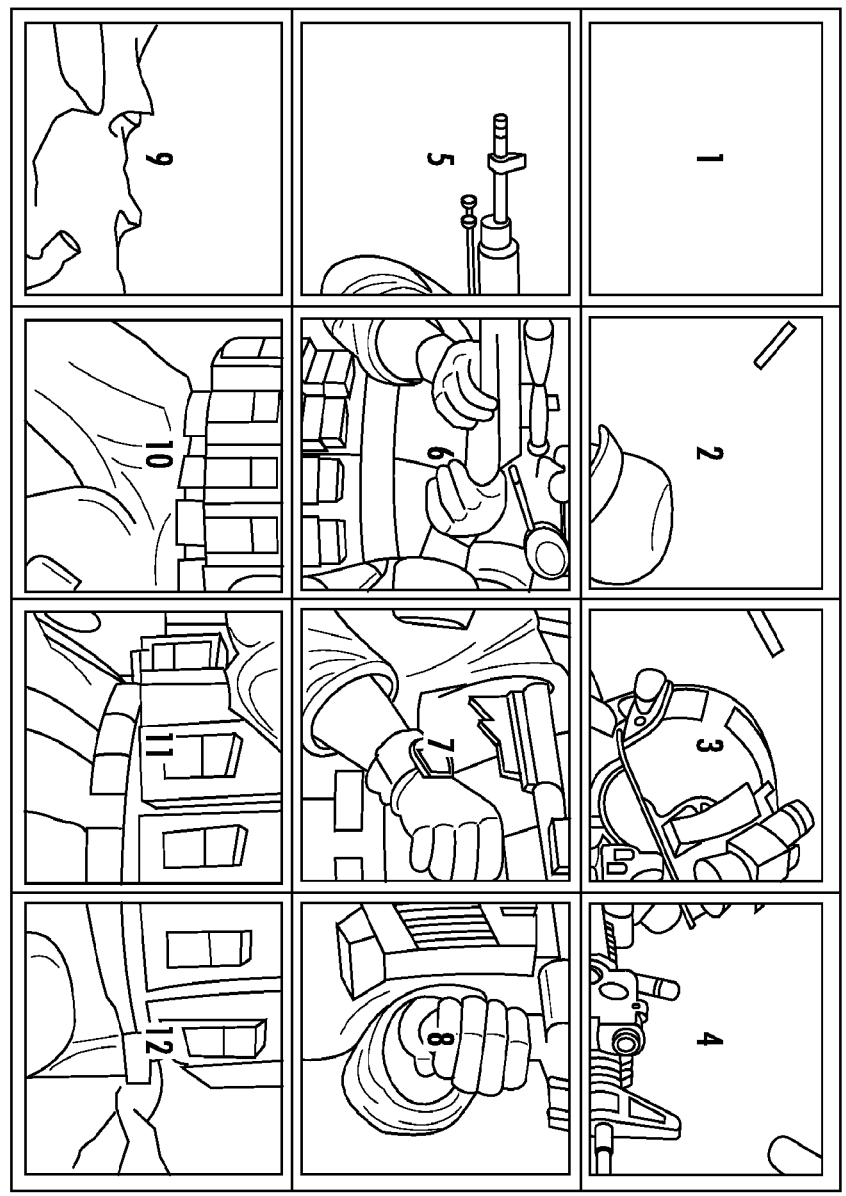

Turning now to the figures, FIGS. 5A to 5C illustrate the varying stages of the image transposition from landscape to portrait. FIG. 5A provides an original image in landscape image orientation providing a large scale representation of how each pixel is originally arranged in the original video image. While it is appreciated that a 1080p video pixel matrix is much larger, a 3×4 matrix ($A_{m,n}$) to 4×3 matrix ($A^T_{n,m}$) is used for illustrative purposes only. FIG. 5B provides a visual representation of how the image data is relocated within the original landscape image to create a scrambled/encoded image which remains in landscape orientation. Here the original image pixels are relocated from bottom to top and left to right from the original image to the relocated image to create an intermediate matrix or relocated image $A'_{m,n}$. FIG. 5C provides a visual representation of the image after it is received and converted providing a portrait image. Here the relocated image is converted to the portrait image, thus for the $A^T_{n,m}$. The image represented by the matrix $A^T_{n,m}$ is the original image transposed to a portrait image orientation. It is appreciated that this is only an example and that a matrix for a 1920×1080 image would be transposed from $A_{1080,1920}$ to $A^T_{1920,1080}$ with the intermediate matrix, or relocated image of $A'_{1080,1920}$.

Conversion Systems

A system for transposing an image from landscape to portrait is also provided. The system includes a video source containing at least one video image, a pixel shader for receiving at least one video image and relocating the pixels of the video image while maintaining the picture orientation to create a scrambled/encoded image, a WirelessHD video transmitter for transmitting said relocated image, a WirelessHD video receiver for receiving said scrambled/encoded image, a converter for unscrambling/decoding the received image while changing its orientation to portrait orientation, and a video display device for displaying the final unscrambled/decoded/converted image in portrait image orientation.

In some embodiments, the pixel shader is included as software on a computer video card. The pixel shader relocates pixels at the final stage of video processing, at the end of each frame and immediately before the video card outputs the frame in the output stream HDMI signal to an HDMI signal transmitter. It is appreciated that relocating pixels is a very simple task for a pixel shader, and can be accomplished at very high speed by the video card. Thus the output of the pixel shader is a scrambled/encoded image which contains all the original pixels with original colors, though pixels are rearranged within the image (for subsequent processing after image transmission). The relocated image (output of pixel shader) is an ordinary HDMI 1080p image, still in landscape image orientation. As a result, the altered (relocated pixels) image will transmit across a WirelessHD channel the same as would any other 1080p 60 Hz landscape image. It is appreciated that the received images may be displayed, however, the displayed image would not appear correct to a human observer because pixels of the original image had been rearranged to create the scrambled/encoded image prior to WirelessHD transmission to the WirelessHD receiver.

In at least one embodiment, a converter board is connected to receive the output of the image receiver. The converter board converts each frame of the received relocated image in Landscape image orientation to a Portrait image orientation at 1080 by 1920 resolution. In some embodiments, the converter board utilizes a field programmable gate array (FPGA) integrated circuit programmed to "undo" the pixel-relocation process done by the pixel shader while simultaneously converting the frame from Landscape to Portrait. In at least one embodiment, the conversion process occurs in real time on a "per row" basis. In at least one embodiment, the converter buffers a portion of an image's first row before those pixels (reoriented) are sent to the display device. After buffering a portion of the first row (less than 17 microseconds of elapsed time)), the converter rearranges the pixels to a Portrait image orientation at the same rate as it continues to receive Landscape mode input data. As a result, the entire output frame will lag the input frame by less than 17 microseconds. Such minor latency cannot be noticed by the human eye, resulting in a significant enhancement to virtual reality or augmented reality systems.

In some embodiments, the converted image is communicated directly to a display screen which correctly displays the original image in a portrait image orientation. In at least one embodiment, the image is communicated to the HDMI input of a natively Portrait mode 1080×1920 60 Hz "cell phone style" display. When the "cell-phone style display" is physically rotated 90 degrees (onto its side), the visual display will be exactly the same as the original Landscape image (prior to the pixel shading step).

In some embodiments, a commercially available HDMI-to-Parallel-Data integrated circuit is used to convert the incoming HDMI signal (output from the HD receiver) to parallel data representing each pixel with original 24-bit color resolution prior to conversion. As discussed previously, the converter board reverses the pixel relocation in real-time during the process of converting from landscape image orientation to a portrait image orientation. In some embodiments, the output of the converter is 24-bit parallel digital data. In at least one embodiment, the converter board parallel data output is communicated to a commercially available Parallel-Data-to-HDMI integrated circuit for reassembly into a 1080 by 1920 resolution, 60 Hz (Portrait orientation) HDMI signal for visual presentation by the output display device.

It is appreciated that any transmitter receiver combination can be used. In at least one embodiment, the HD signal transmitter and HD signal receiver transmit and receive wireless HD signals. It is further appreciated that in some embodiments the displays for the converted portrait image are used within a virtual reality or augmented reality headset.

Figure 4:
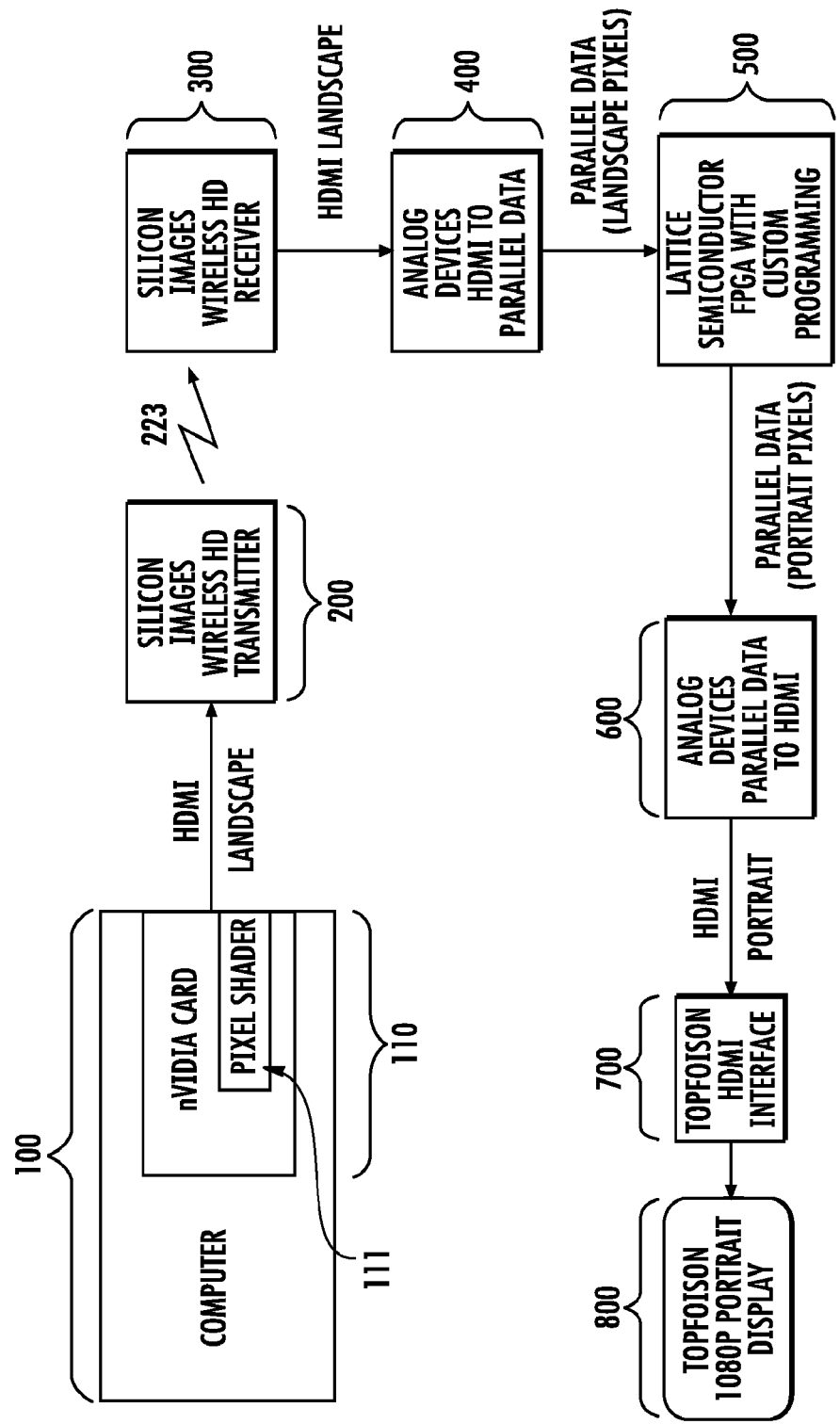
FIG. 4 provides a block diagram of the inventive system for transposing an image from landscape to portrait.
Figure 6:
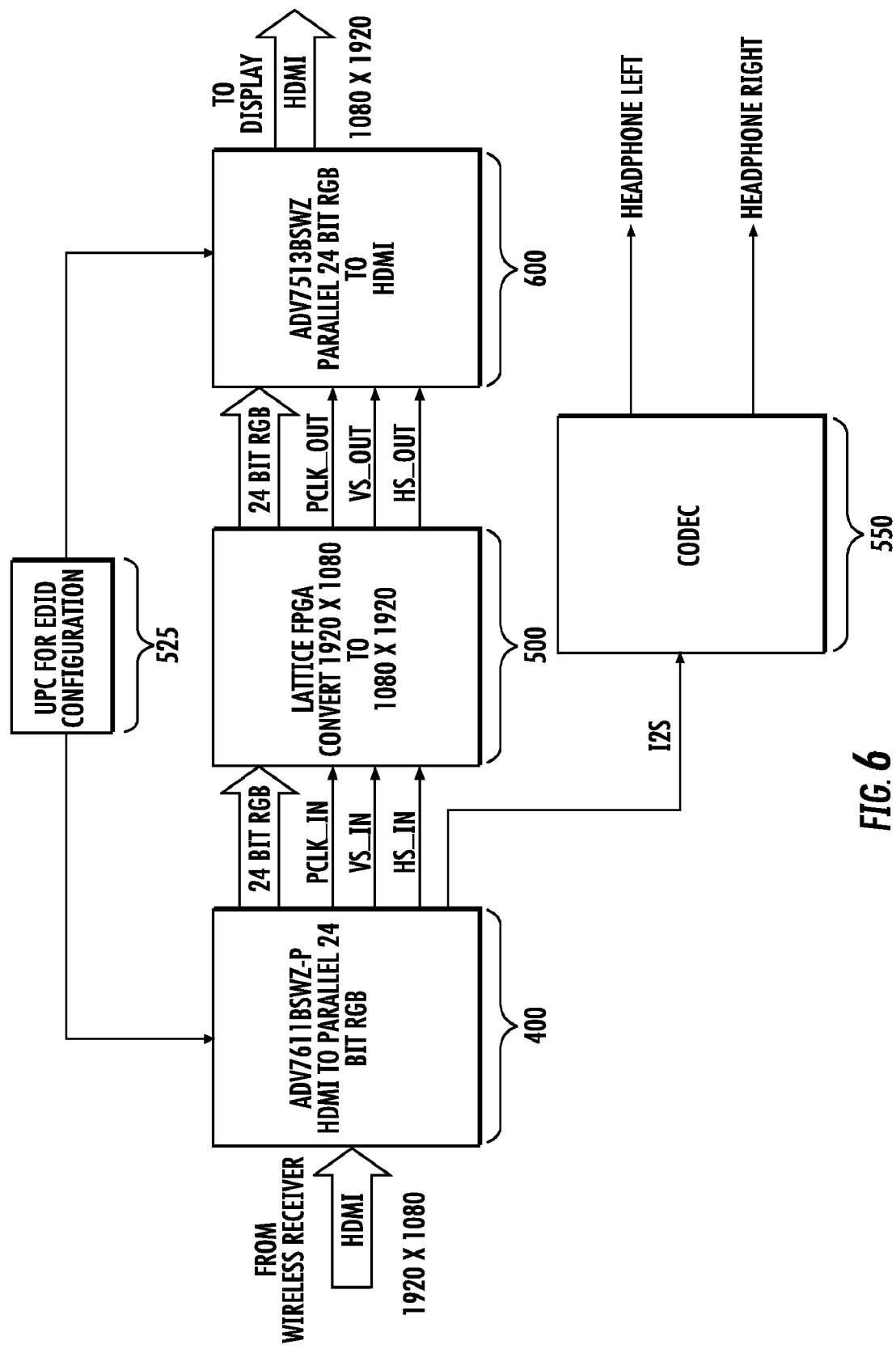
FIG. 6 provides a system diagram for a receiving headset or receiving unit for receiving the relocated image data.

Turning to the drawings, FIG. 4 provides a block diagram of the inventive system for transposing an image from landscape to portrait. In one embodiment of the system, a 100 computer contain a 110 graphics card, where the 110 graphics card contains a 111 pixel shader for relocating pixel data from the original image to create a relocated image. The relocated image, retaining the landscape image orientation, is communicated from the 110 graphics card containing the 111 pixel shader to a 200 WirelessHD video transmitter to be 223 wirelessly transmitted to a 300 WirelessHD video receiver. The 300 video receiver communicates the received relocated image to an 400 HDMI-to-Parallel-Data integrated circuit for conversion of the output from the 300 video receiver to parallel data representing each pixel with original 24-bit color resolution. The parallel data is then converted to a portrait image orientation using a 500 field programmable gate array (FPGA) integrated circuit programmed to "undo" the pixel-relocation process done by the pixel shader while simultaneously converting the frame from Landscape to Portrait. The transposed image is then sent to a 600 Parallel-Data-to-HDMI integrated circuit for conversion of the output of the 500 FGPA to an HDMI signal to be communicated to a 700 HDMI interface in communication with an 800 portrait display. FIG. 6 further provides the signal paths from the received relocated image from the 300 WirelessHD receiver to the to an 400 HDMI-to-Parallel-Data integrated circuit for conversion to parallel data, then conversion to a portrait image orientation using the 500 FPGA then communicated to a 600 Parallel-Data-to-HDMI integrated circuit for conversion of the output of the 500 FGPA to an HDMI signal.

Figure 7:
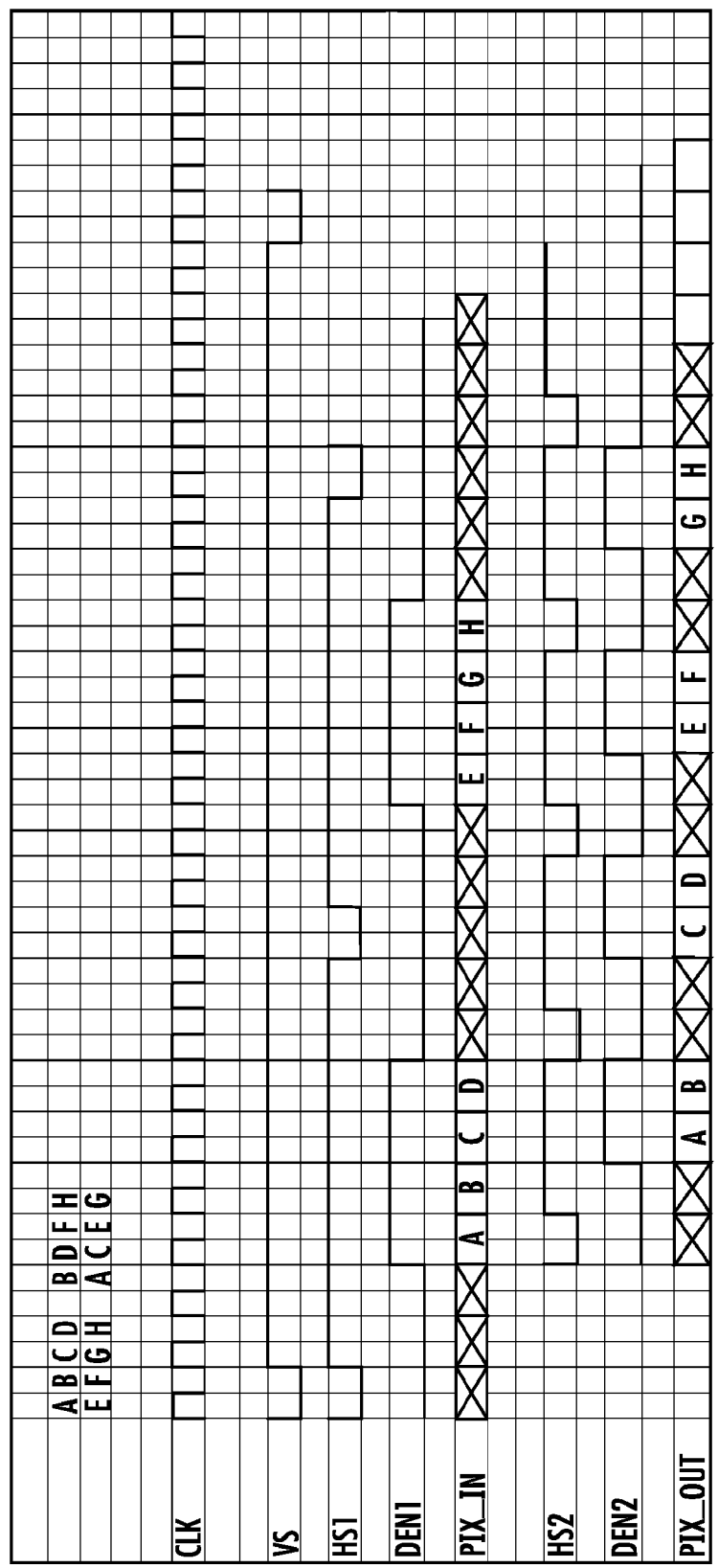
FIG. 7 provides a timing diagram illustrating a 4×2 Landscape image reformatted into a 2×4 Portrait image

FIG. 7 illustrates a timing diagram for an example 4×2 Landscape image reformatted into a 2×4 Portrait image. Parallel data signals are sent through an 500 FPGA. The 500 FPGA will buffer the first few pixels and then start sending them out with adjusted vertical and horizontal sync signals (VS and HS). As seen below, the first 4 pixels come in (PIX_IN) 4 at a time between the HS signals. The FPGA buffers these pixels and retransmits them, 2 at a time, between the HS signals (PIX_OUT). This effectively converts the video data into a Portrait format. The resulting signals are sent into a 600 parallel to HDMI chip. The resulting Portrait HDMI signal is sent as a portrait oriented image for display. Some embodiments may include an 550 audio codec to separate audio from the HDMI signal. The 550 codec includes an amplifier to drive the user's headphones. In some embodiments a 525 microcontroller provides Extended Display Identification Data (EDID) configuration data to the HDMI 200 transmitter and 300 receiver chips. In certain embodiments, system power is taken from the HDMI cable. Otherwise, in other embodiments a separate connector provides external power.

The inventive system is used for 1920×1080 (1080p) video. Each row (line) of a standard 1080p HDMI video stream includes blank pixels as padding at the beginning and end of lines. The time spent by passage of these "wasted" blank pixels makes up for the difference in the number of HS signals between Landscape and Portrait formats. The use of this system assures a lag of less than one row of pixel data in the output video stream (less than 17 microseconds of elapsed time) thus providing a usable virtual or augmented simulation.

EXAMPLES

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

Example 1—Wireless VR System

A virtual reality system is provided which includes a receiver for receiving a specially composited video/audio/data signal, a computing device, a three dimensional position tracker, and a transmitter having a steerable antenna. The system further includes a virtual reality headset. The receiver, headset and three dimensional position tracker are worn by a user with the three dimensional position tracker and the receiver placed in proximity of each other. A virtual reality or augmented reality session is initiated and the transmitter transmits the signal to the receiver. The user moves around while the user's movement is simulated and experienced through the headset which displays a video signal in addition to audio. The transmitter continuously transmits the user interaction in the augmented/virtual reality environment to the receiver in real-time to create an augmented or virtual reality environment. In order to prevent interruption in the signal that would disrupt the virtual/augmented environment, the computing device determines the user's position from the three dimensional position tracker and provides the computed position information to a steerable antennae which is transmitting the signal. The antennae steers its beam in real-time to maintain line of sight to the receiver being worn by the user. As a result the user experiences a seamless and reliable virtual reality signal containing video, audio and data.

Example 2—Wireless VR System with Remote Commands

A virtual reality system according Example 1 is provided that further embodies remote commands (instructions) from the computer or similar source, through the transmitter and its antennae, to the receiver proximal to the virtual reality user, such that the remote commands are received and interpreted following reception for local execution proximal to the receiver (virtual reality participant). A specific example would be a remote command to mute the microphone on the virtual reality headset, where the mute command would be executed within the virtual reality headset.

Example 3—Matrix Operations for Image Transposition

In at least one embodiment, the matrix of $A_{m,n}$ is relocated to create the relocated image of matrix $A'_{m,n}$. Where $$A_{m,n} = A_{3,4} \text{ and } A_{3,4} = \begin{bmatrix} 1 & 2 & 3 & 4 \\ 5 & 6 & 7 & 8 \\ 9 & 10 & 11 & 12 \end{bmatrix}.$$

It is the original image pixels are relocated from bottom to top and left to right from the original image to the relocated image to create an intermediate matrix or relocated image $A'_{m,n}$, where $$A'_{m,n} = A'_{3,4} \text{ and } A'_{3,4} = \begin{bmatrix} 9 & 5 & 1 & 10 \\ 6 & 2 & 11 & 7 \\ 3 & 12 & 8 & 4 \end{bmatrix}.$$

Thus upon completion of the inventive process, the matrix $A_{m,n}$ is relocated to the matrix $A'_{m,n}$, transmitted as a relocated image, and received and simultaneously converted while being received, to the transposed matrix. Thus where $$A^T_{m,n} = A^T_{4,3}, A^T_{4,3} = \begin{bmatrix} 9 & 5 & 1 \\ 10 & 6 & 2 \\ 11 & 7 & 3 \\ 12 & 8 & 4 \end{bmatrix}.$$

The image represented by the matrix $A^T_{4,3}$ is the original image transposed to a portrait image orientation. It is appreciated that this is only an example and that various resolutions could be substituted into the process or matrix operations. By way of example a matrix for a 1920×1080 image would be transposed from $A_{1080,1920}$ to $A^T_{1920,1080}$ with the intermediate matrix, or relocated image of $A'_{1080,1920}$.

Example 4—Inventive Image Conversion Systems

A pixel shader (software on the computer's video card) will relocate pixels at the final stage of video processing, at the end of each frame and immediately before the video card outputs the frame in the output stream HDMI signal. Relocating pixels is a very simple task for a pixel shader, and can be accomplished at very high speed by the video card (just like many other pixel shader's work). The result is an image that contains all the original pixels with original colors, though pixels will be rearranged within the image (for subsequent processing after wireless transmission). The rearranged image (output of pixel shader) is an ordinary HDMI 1080p image, still in Landscape mode. As a result, the altered (relocated pixels) image will transmit across a WirelessHD channel the same as would any other 1080p 60 Hz Landscape image.

The output of the WirelessHD Receiver module is an HDMI signal, still in Landscape mode. That signal could be fed into a computer monitor (configured for 1920*1080 resolution at 60 Hz) but the image would not appear correct to a human observer because pixels had been rearranged earlier.

A converter board will be designed to accept the output of the WirelessHD Receiver module, and convert each frame of the received Landscape image to a Portrait image at 1080 by 1920 resolution for display on a 1080 * 1920 60 Hz "cell phone style" display (Topfoison or any other manufacturer's). When that cell-phone style display is physically rotated 90 degrees (onto its side), the visual display will be exactly the same as the original Landscape image (prior to the pixel shading step). The conversion will be accomplished by a commercially available Field Programmable Gate Array (FPGA) integrated circuit that will be programmed to "undo" the pixel-relocation process done by the pixel shader while simultaneously converting the frame from Landscape to Portrait.

The conversion process occurs in real time on a "per row" basis. The converter FPGA buffers part of the first row of a frame's pixels before those pixels (reoriented) can be sent to the display. After that initial and very short buffer time (less than 17 microseconds), the converter chip can output Portrait mode data at the same rate as it receives Landscape mode input data. As a result, the entire output frame lags the input frame by less than the buffer time.

The design is implemented with only a handful of commercially available integrated circuits, especially HDMI signal processing chips as used in standard HDMI applications. Analog Device's HDMI-to-Parallel-Data chip converts the incoming HDMI signal (output from the Silicon Images' Wireless HD Receiver) to parallel data representing each pixel with original 24-bit color resolution. A commercially available FPGA from Lattice Semiconductor (parent company of Silicon Images) is programmed to reverse the pixel relocation in real time during the process of converting from Landscape to Portrait. The FPGA's output is 24-bit parallel digital data identical in nature to the FPGA's input digital data. The FPGA's parallel data output is fed directly into an Analog Devices Parallel-Data-to-HDMI chip for reassembly into a 1080 by 1920 resolution, 60 Hz (Portrait orientation) HDMI signal. That HDMI signal is fed directly into the HDMI input on the circuit board that comes with the Topfoison display.

Other Embodiments

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

The foregoing description is illustrative of particular embodiments of the invention, but is not meant to be a limitation upon the practice thereof. The following claims, including all equivalents thereof, are intended to define the scope of the invention.

The invention claimed is:

1. A method for rotating a transmitted video image from portrait to landscape, the method comprising:
   processing a video image that has landscape image orientation on a computing device;
   relocating pixels of said image on a video card of said computing device creating a scrambled/encoded image while maintaining landscape image orientation;
   transmitting said scrambled/encoded image as relocated image data from an output of said video card to one or more receiving devices;
   receiving said scrambled/encoded image data by one or more receiving device wherein said one or more receiving device creates an unscrambled/decoded image upon receipt of said relocated image data that is in portrait image orientation.

2. The method of claim 1, wherein relocating pixels of said image comprises:
   processing pixel data of the video image; and
   moving the pixel data from a pixel location in the video image to a different pixel location in a relocated image, such that the image data within the relocated image is transposed while remaining in a landscape image orientation.

3. The method of claim 2 wherein said creating a transposed image further comprises receiving said relocated image data and creating a portrait image from the received image data while continuously receiving image data.

4. The method of claim 3 further comprising buffering less than one frame of transposed image, as little as a portion of just one row of the transposed image.

5. A system for transposing an image from landscape to portrait, the system comprising:
   a video source containing at least one video image;
   a pixel shader for receiving the at least one video image and relocating the pixels of the video image while maintaining the picture orientation to create a relocated image;
   a high definition (HD) video transmitter for transmitting said relocated image;
   a HD video receiver for receiving said relocated image;
   a converter for transposing the received relocated image to a portrait image orientation; and a display for receiving the transposed image in portrait image orientation.

6. The system of claim 5 wherein said converter is a field programmable gate array for converting the portrait image to a landscape image.

7. The system of claim 5 wherein said transmitter and said receiver is a wireless transmitter and a wireless receiver.

8. The system of claim 5 wherein said display is located within a virtual reality or augmented reality headset.

* * * * *